United States Patent
Ding et al.

(10) Patent No.: US 10,681,644 B2
(45) Date of Patent: Jun. 9, 2020

(54) REPORTING ACTUAL UPLINK TRANSMISSION POWER

(71) Applicant: QUALCOMM Incorporated, San Diego, CA (US)

(72) Inventors: Ling Ding, Chester, NJ (US); Junsheng Han, Sunnyvale, CA (US); Raghu Narayan Challa, San Diego, CA (US); Junyi Li, Chester, NJ (US)

(73) Assignee: QUALCOMM Incorporated, San Diego, CA (US)

(*) Notice: Subject to any disclaimer, the term of this patent is extended or adjusted under 35 U.S.C. 154(b) by 0 days.

(21) Appl. No.: 16/157,498

(22) Filed: Oct. 11, 2018

(65) Prior Publication Data
US 2020/0068493 A1     Feb. 27, 2020

Related U.S. Application Data

(60) Provisional application No. 62/720,310, filed on Aug. 21, 2018.

(51) Int. Cl.
| H04W 52/14 | (2009.01) |
| H04W 52/32 | (2009.01) |
| H04W 52/36 | (2009.01) |

(52) U.S. Cl.
CPC ....... H04W 52/146 (2013.01); H04W 52/325 (2013.01); H04W 52/365 (2013.01)

(58) Field of Classification Search
CPC ............. H04W 52/146; H04W 52/365; H04W 52/325
See application file for complete search history.

(56) References Cited

U.S. PATENT DOCUMENTS 8,848,556 B2 *  9/2014  Wu .................. H04W 72/0413
                                                    370/252
9,210,671 B2 * 12/2015  Bostrom ............ H04W 52/367
(Continued)

FOREIGN PATENT DOCUMENTS

WO     2012061582 A1     5/2012

OTHER PUBLICATIONS

Ericsson: "Open Issues Phr Enhancements", 3GPP Draft, 3GPP TSG-RAN2 Meeting #102, R2-1807778, 3rd Generation Partnership Project (3GPP), Mobile Competence Centre, 650, Route Des Lucioles, F-06921 Sophia-Antipolis Cedex, France, vol. RAN WG2, No. Busan, South Korea, 20180521-20180525, May 20, 2018 (May 20, 2018), XP051444121, pp. 1-3, URL: http://www.3gpp.org/ftp/Meetings%5F3GPP%5FSYNC/RAN2/Docs/ [retrieved on May 20, 2018] Section 2, p. 2.
(Continued)

*Primary Examiner* — Jinsong Hu
*Assistant Examiner* — Rui M Hu
(74) *Attorney, Agent, or Firm* — Changwoo Yang

(57) ABSTRACT

Method and apparatus are provided for reporting and receiving actual UL transmission power. In accordance with some implementation, a UE may send a first indication of power headroom to a base station. The UE may receive one or more resources allocation for a UL transmission. The UE then may determine actual transmission power to be used in the UL transmission. Upon determination, the UE may transmit the UL transmission and send an indication of the actual transmission power to the base station. The base station, in response to receiving an indication of actual transmission power of the first UL transmission, may adjust an estimate of the link quality based on the receive indication of actual transmission power.

30 Claims, 9 Drawing Sheets

(56) References Cited

U.S. PATENT DOCUMENTS

| | | | |
|---|---|---|---|
| 9,408,162 B2* | 8/2016 | Ho | H04W 52/367 |
| 9,661,590 B2* | 5/2017 | Haim | H04W 52/365 |
| 2006/0286996 A1* | 12/2006 | Julian | H04B 7/022 |
| | | | 455/522 |
| 2008/0130589 A1* | 6/2008 | Gorokhov | H04L 5/0007 |
| | | | 370/336 |
| 2010/0296470 A1* | 11/2010 | Heo | H04W 52/34 |
| | | | 370/329 |
| 2011/0038271 A1* | 2/2011 | Shin | H04W 52/146 |
| | | | 370/252 |
| 2011/0080838 A1* | 4/2011 | Larsson | H04W 52/346 |
| | | | 370/252 |
| 2011/0105173 A1* | 5/2011 | Haim | H04W 52/325 |
| | | | 455/522 |
| 2011/0134774 A1* | 6/2011 | Pelletier | H04L 5/001 |
| | | | 370/252 |
| 2011/0243016 A1* | 10/2011 | Zhang | H04W 72/04 |
| | | | 370/252 |
| 2011/0243106 A1* | 10/2011 | Hsu | H04W 72/1284 |
| | | | 370/336 |
| 2011/0281525 A1* | 11/2011 | Furuskar | H04B 17/391 |
| | | | 455/67.11 |
| 2011/0292874 A1* | 12/2011 | Ho | H04W 52/365 |
| | | | 370/328 |
| 2011/0312366 A1* | 12/2011 | Yang | H04W 52/365 |
| | | | 455/522 |
| 2012/0008552 A1* | 1/2012 | Baldemair | H04W 52/365 |
| | | | 370/328 |
| 2012/0044882 A1* | 2/2012 | Kim | H04L 5/0094 |
| | | | 370/329 |
| 2012/0082041 A1* | 4/2012 | Damnjanovic | H04W 52/365 |
| | | | 370/252 |
| 2012/0082043 A1* | 4/2012 | Hwang | H04L 5/001 |
| | | | 370/252 |
| 2012/0113832 A1* | 5/2012 | Montojo | H04L 1/1671 |
| | | | 370/252 |
| 2012/0113833 A1* | 5/2012 | Jen | H04W 52/30 |
| | | | 370/252 |
| 2012/0178494 A1* | 7/2012 | Haim | H04W 52/34 |
| | | | 455/522 |
| 2012/0213149 A1* | 8/2012 | Chakraborty | H04W 52/365 |
| | | | 370/328 |
| 2012/0224535 A1* | 9/2012 | Kim | H04W 72/042 |
| | | | 370/328 |
| 2013/0051259 A1* | 2/2013 | Kim | H04W 72/1231 |
| | | | 370/252 |
| 2018/0167897 A1 | 6/2018 | Sampath et al. | |

OTHER PUBLICATIONS

International Search Report and Written Opinion — PCT/US2019/042459— ISA/EPO — Sep. 10, 2019.
Qualcomm Inc: "Definition of Pcmax,c", 3GPP Draft, 3GPP TSG-RAN WG1 #63, R1-106348 Definition of Pcmax,c, 3rd Generation Partnership Project (3GPP), Mobile Competence Centre, 650, Route Des Lucioles, F-06921 Sophia-Antipolis Cedex, France, vol. RAN WG1, No. Jacksonville, USA, 20101115, Nov. 10, 2010 (Nov. 10, 2010), XP050489826, pp. 1-5, [retrieved on Nov. 10, 2010] Section 2, p. 3 Section 2.4.1, pp. 3-4.

* cited by examiner

REPORTING ACTUAL UPLINK TRANSMISSION POWER

CROSS REFERENCES

The present application for patent claims priority to U.S. Provisional Patent Application No. 62/720,310 by Ling Ding, et al., entitled "REPORTING ACTUAL UL TRANSMISSION POWER," filed Aug. 21, 2018, assigned to the assignee hereof.

TECHNICAL FIELD

The present disclosure relates generally to wireless communication systems, and more particularly, to methods and apparatus for generating and reporting actual transmission power.

INTRODUCTION

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, (e.g., a Long Term Evolution (LTE) system, or a New Radio (NR) system). A wireless multiple-access communications system may include a number of base stations or access network nodes, each simultaneously supporting communication for multiple communication devices, which may be otherwise known as user equipment (UE).

The UE may transmit a power headroom report (PHR) to each of the connected base stations using its configured maximum transmit power. The configured maximum transmit power is based on an overall transmission power value and a static split ratio value. The base stations may allocate additional radio resources to the UE based on the PHR. However, the transmitted PHR may not reflect the true power headroom (PH) of the UE at the time of transmission. Such discrepancy may result in inefficiency with regards to subsequent scheduling and/or link adaptation. Hence, it is desirable to improve on the accuracy of the communication of UE transmit power information to the base station.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Certain aspects of the present disclosure provide a method for wireless communications by a UE. The method generally includes sending a first indication of power headroom (PH), receiving resource allocation for a UL transmission, determining actual transmission power to be used in the UL transmission, and sending an indication of the actual transmission power.

Certain aspects of the present disclosure provide a method for wireless communications by a base station (BS). The method generally includes receiving an indication of PH, sending resource allocation for a first UL transmission based at least on the indication of PH, receiving the first UL transmission, receiving an indication of actual transmission power of the first UL transmission, and adjusting an estimate of the link quality based on the indication of actual transmission power.

Aspects generally include methods, apparatus, systems, computer readable mediums, and processing systems, as substantially described herein with reference to and as illustrated by the accompanying drawings.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
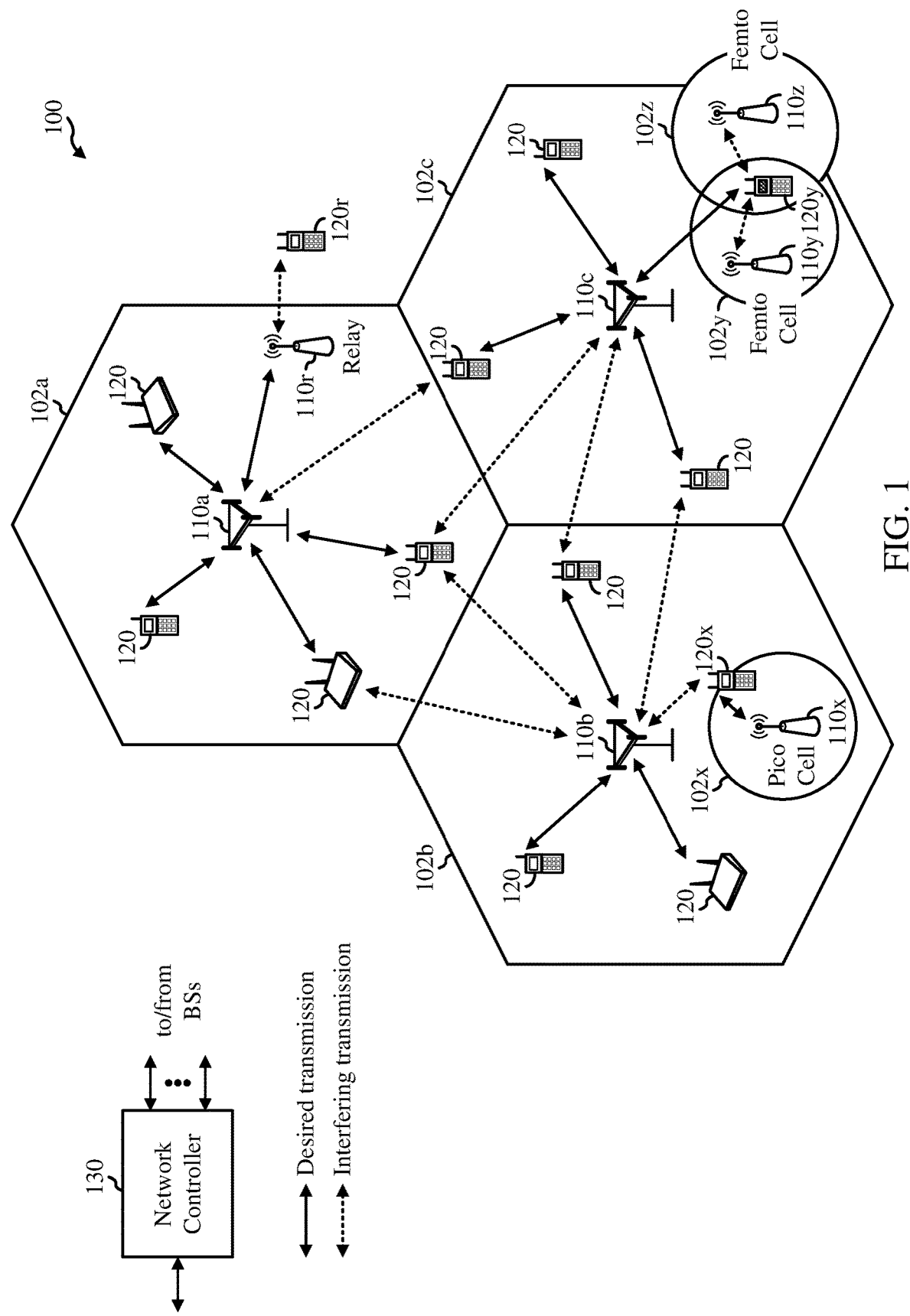
FIG. 1 is a block diagram conceptually illustrating an example telecommunications system, in accordance with certain aspects of the present disclosure.

Power headroom (PH) generally indicates how much transmission power is left for a UE to use in addition to the power being used for a current transmission (e.g., PUSCH transmission). Power headroom may be described as the maximum UE transmission power minus current PUSCH power. A positive value of the power headroom indicates that the UE has more power to spare for UL transmissions. A negative value of the power headroom indicates that the UE is required to transmit at a power higher than what the UE is allowed to transmit.

Power Headroom Report (PHR) is a type of MAC CE (MAC Control Element) that reports the headroom between the current UE Tx power (estimated power) and the nominal power. The network (e.g., base station) uses this report value to estimate how much uplink bandwidth a UE can use for a specific subframe.

In certain aspects, a reported PHR may not reflect the actual PH at the time of UL transmission. The discrepancy between the reported PHR and the actual PH may be due to the delay between the time of determining PH for the PHR report and the actual uplink (UL) transmission. The delay may be caused by timing restraint on PHR transmission, e.g., PHR can be transmitted only when UE has UL resources allocated and when that resource can accommodate a MAC control element (CE). In addition, delay may be caused by a PHR-Prohibit timer. In conjunction to the delay, the discrepancy may arise because actual UL transmission power may be impacted by time-varying maximum permissible exposure (MPE) conditions and time-varying nature of the serving beam. In such cases, UE may be required to further backoff its transmission power to satisfy the MPE restraints and/or adjust to the variation of the serving beam.

In certain aspects, a reference PHR, which is different from an actual PHR, is reported for cases when UE does not have the assignment information available at the time of calculating PH. For example, in case of carrier aggregation (CA), there may be multiple carriers/cells configured for the UE, but at the time of calculating PH (e.g., based on a PHR trigger) there may be data scheduled only for a subset of carriers in a particular TTI (e.g., slot). In this case the UE reports reference PHR for the TTI for those carriers which do not have any uplink data scheduled in that TTI. For example, in certain cases, the UE may not have enough time to calculate actual PH for certain carriers/cells based on DCI received on the respective carriers. In such cases, UE may be required to further backoff its UL transmission power to take into consideration the actual PH.

Discrepancy between the reported PHR and the actual PH may cause inefficiency in the communication between the UE and the BS. For example, if a UE decides to further backoff its transmission power at the time of transmission, the transmission may not be able to meet the reception requirement of the resource allocation (e.g., assigned MCS). In such cases, BS may not receive the UL transmission which then may trigger HARQ process so that it may recover from the reduction of Tx power. Further recovery process may be triggered such as recovery processes in RLC, PDCP, or TCP. Such loss of transmission may lead to mis-calibration of link adaptation at the BS because, for example, the BS may erroneously perceive a sudden degradation of channel (e.g., increase in path loss). Similar inefficiency may arise if, for example, the UE decides to cut off it transmission power at the time of transmission due to the required backoff.

Certain aspects of the present disclosure discuss techniques for reporting more accurate UL transmission power by determining and reporting, to a BS, the actual transmission power to be used by a UE. The BS may adjust its link quality estimation based on the actual transmission power report.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication networks such as LTE, CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). NR is an emerging wireless communications technology under development in conjunction with the 5G Technology Forum (5GTF). 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

Example Wireless Communications System

FIG. 1 illustrates an example wireless network 100, such as a new radio (NR) or 5G network, in which aspects of the present disclosure may be performed.

As illustrated in FIG. 1, the wireless network 100 may include a number of BSs 110 and other network entities. A BS may be a station that communicates with UEs. Each BS 110 may provide communication coverage for a particular geographic area. In 3GPP, the term "cell" can refer to a coverage area of a Node B and/or a Node B subsystem serving this coverage area, depending on the context in which the term is used. In NR systems, the term "cell" and eNB, Node B, 5G NB, AP, NR BS, NR BS, or TRP may be interchangeable. In some examples, a cell may not necessarily be stationary, and the geographic area of the cell may move according to the location of a mobile base station. In some examples, the base stations may be interconnected to one another and/or to one or more other base stations or network nodes (not shown) in the wireless network 100 through various types of backhaul interfaces such as a direct physical connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a frequency channel, etc. Each frequency may support a single RAT in a given geographic area in order to avoid interference between wireless networks of different RATs. In some cases, NR or 5G RAT networks may be deployed.

A BS may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BS for the femto cells 102y and 102z, respectively. A BS may support one or multiple (e.g., three) cells.

The wireless network 100 may also include relay stations. A relay station is a station that receives a transmission of data and/or other information from an upstream station (e.g., a BS or a UE) and sends a transmission of the data and/or other information to a downstream station (e.g., a UE or a BS). A relay station may also be a UE that relays transmissions for other UEs. In the example shown in FIG. 1, a relay station 110r may communicate with the BS 110a and a UE 120r in order to facilitate communication between the BS 110a and the UE 120r. A relay station may also be referred to as a relay BS, a relay, etc.

The wireless network 100 may be a heterogeneous network that includes BSs of different types, e.g., macro BS, pico BS, femto BS, relays, etc. These different types of BSs may have different transmit power levels, different coverage areas, and different impact on interference in the wireless network 100. For example, macro BS may have a high transmit power level (e.g., 20 Watts) whereas pico BS, femto BS, and relays may have a lower transmit power level (e.g., 1 Watt).

The wireless network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time. The techniques described herein may be used for both synchronous and asynchronous operation.

A network controller 130 may be coupled to a set of BSs and provide coordination and control for these BSs. The network controller 130 may communicate with the BSs 110 via a backhaul. The BSs 110 may also communicate with one another, e.g., directly or indirectly via wireless or wireline backhaul.

The UEs 120 (e.g., 120x, 120y, etc.) may be dispersed throughout the wireless network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or medical equipment, a biometric sensor/device, a healthcare device, a medical device, a wearable device such as a smart watch, smart clothing, smart glasses, virtual reality goggles, a smart wrist band, smart jewelry (e.g., a smart ring, a smart bracelet, etc.), an entertainment device (e.g., a music device, a gaming device, a video device, a satellite radio, etc.), a vehicular component or sensor, a smart meter/sensor, industrial manufacturing equipment, a positioning device (e.g., GPS, Beidou, GLONASS, Galileo, terrestrial-based), or any other suitable device that is configured to communicate via a wireless or wired medium. Some UEs may be considered machine-type communication (MTC) devices or enhanced or evolved MTC (eMTC) devices. MTC may refer to communication involving at least one remote device on at least one end of the communication and may include forms of data communication which involve one or more entities that do not necessarily need human interaction. MTC UEs may include UEs that are capable of MTC communications with MTC servers and/or other MTC devices through Public Land Mobile Networks (PLMN), for example. Some UEs may be considered Internet of Things devices. The Internet of Things (IoT) is a network of physical objects or "things" embedded with, e.g., electronics, software, sensors, and network connectivity, which enable these objects to collect and exchange data. The Internet of Things allows objects to be sensed and controlled remotely across existing network infrastructure, creating opportunities for more direct integration between the physical world and computer-based systems, and resulting in improved efficiency, accuracy and economic benefit. When IoT is augmented with sensors and actuators, the technology becomes an instance of the more general class of cyber-physical systems, which also encompasses technologies such as smart grids, smart homes, intelligent transportation and smart cities. Each "thing" is generally uniquely identifiable through its embedded computing system but is able to interoperate within the existing Internet infrastructure. Narrowband IoT (NB-IoT) is a technology being standardized by the 3GPP standards body. This technology is a narrowband radio technology specially designed for the IoT, hence its name. Special focuses of this standard are on indoor coverage, low cost, long battery life and large number of devices. MTC/eMTC and/or IoT UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. In FIG. 1, a solid line with double arrows indicates desired transmissions between a UE and a serving BS, which is a BS designated to serve the UE on the downlink and/or uplink. A dashed line with double arrows indicates interfering transmissions between a UE and a BS.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth (e.g., system frequency band) into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a 'resource block') may be 12 subcarriers (or 180 kHz). Consequently, the nominal FFT size may be equal to 128, 256, 512, 1024 or 2048 for system bandwidth of 1.25, 2.5, 5, 10 or 20 megahertz (MHz), respectively. The system bandwidth may also be partitioned into subbands. For example, a subband may cover 1.08 MHz (i.e., 6 resource blocks), and there may be 1, 2, 4, 8 or 16 subbands for system bandwidth of 1.25, 2.5, 5, 10 or 20 MHz, respectively.

While aspects of the examples described herein may be associated with LTE technologies, aspects of the present disclosure may be applicable with other wireless communications systems, such as NR. NR may utilize OFDM with a cyclic prefix (CP) on the uplink and downlink and include support for half-duplex operation using time division duplex (TDD). A single component carrier bandwidth of 100 MHz may be supported. NR resource blocks may span 12 subcarriers with a sub-carrier bandwidth of 75 kHz over a 0.1 ms duration. Each radio frame may consist of 50 subframes with a length of 10 ms. Consequently, each subframe may have a length of 0.2 ms. Each subframe may indicate a link direction (i.e., DL or UL) for data transmission and the link direction for each subframe may be dynamically switched. Each subframe may include DL/UL data as well as DL/UL control data. UL and DL subframes for NR may be as described in more detail below with respect to FIGS. 6 and 7. Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based. NR networks may include entities such as central units (CU) and/or distributed units (DU).

In some examples, access to the air interface may be scheduled, wherein a scheduling entity (e.g., a base station) allocates resources for communication among some or all devices and equipment within its service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. That is, in some examples, a UE may function as a scheduling entity, scheduling resources for one or more subordinate entities (e.g., one or more other UEs). In this example, the UE is functioning as a scheduling entity, and other UEs utilize resources scheduled by the UE for wireless communication. A UE may function as a scheduling entity in a peer-to-peer (P2P) network, and/or in a mesh network. In a mesh network example, UEs may optionally communicate directly with one another in addition to communicating with the scheduling entity.

Thus, in a wireless communication network with a scheduled access to time-frequency resources and having a cellular configuration, a P2P configuration, and a mesh configuration, a scheduling entity and one or more subordinate entities may communicate utilizing the scheduled resources.

As noted above, a RAN may include a CU and DUs. A NR BS (e.g., eNB, 5G Node B, Node B, transmission reception point (TRP), access point (AP)) may correspond to one or multiple BSs. NR cells can be configured as access cell (ACells) or data only cells (DCells). For example, the RAN (e.g., a central unit or distributed unit) can configure the cells. DCells may be cells used for carrier aggregation or dual connectivity, but not used for initial access, cell selection/reselection, or handover. In some cases DCells may not transmit synchronization signals—in some case cases DCells may transmit SS. NR BSs may transmit downlink signals to UEs indicating the cell type. Based on the cell type indication, the UE may communicate with the NR BS. For example, the UE may determine NR BSs to consider for cell selection, access, handover, and/or measurement based on the indicated cell type.

Figure 2:
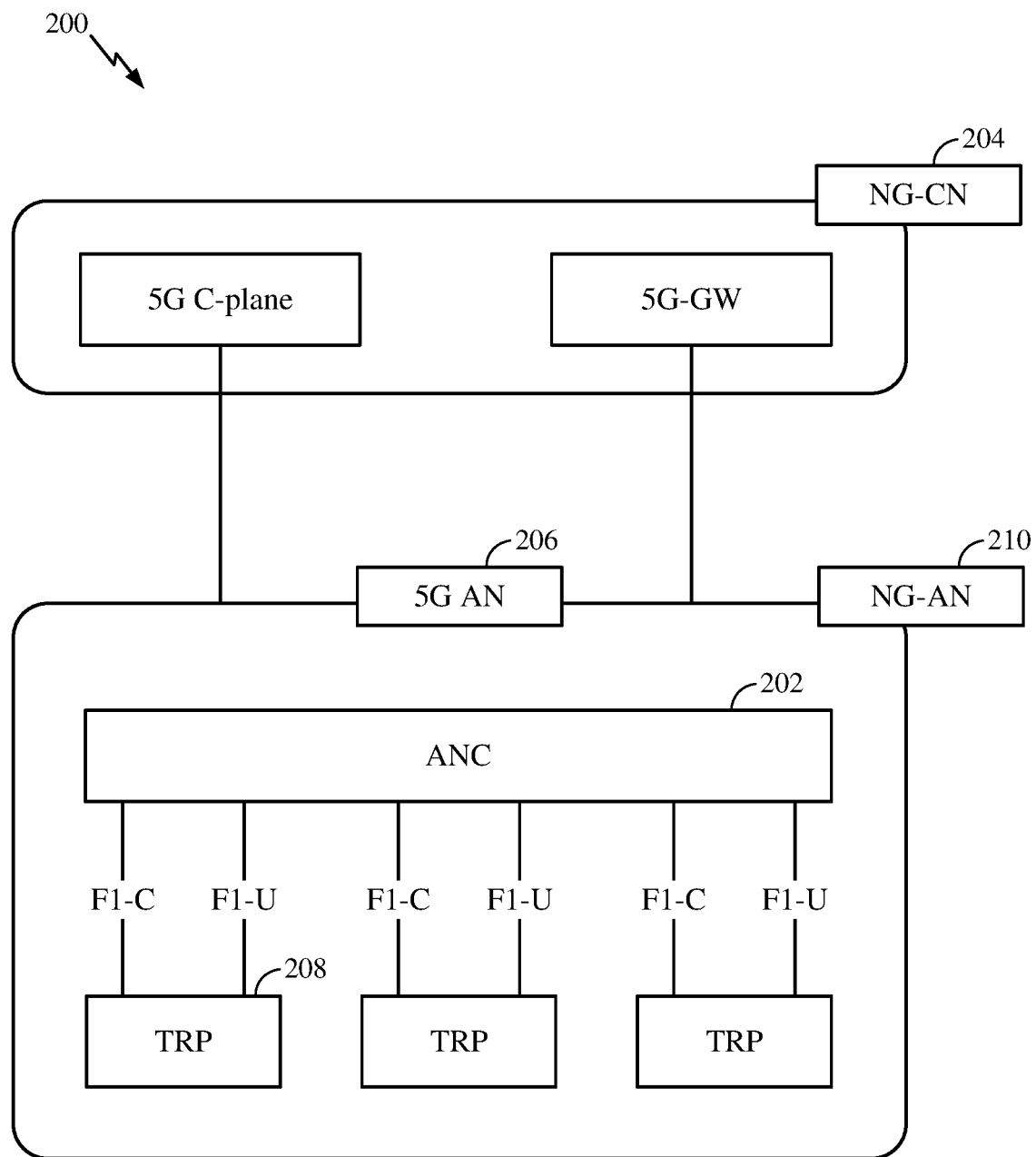
FIG. 2 is a block diagram illustrating an example logical architecture of a distributed RAN, in accordance with certain aspects of the present disclosure.

FIG. 2 illustrates an example logical architecture of a distributed radio access network (RAN) 200, which may be implemented in the wireless communication system illustrated in FIG. 1. A 5G access node 206 may include an access node controller (ANC) 202. The ANC may be a central unit (CU) of the distributed RAN 200. The backhaul interface to the next generation core network (NG-CN) 204 may terminate at the ANC. The backhaul interface to neighboring next generation access nodes (NG-ANs) may terminate at the ANC. The ANC may include one or more TRPs 208 (which may also be referred to as BSs, NR BSs, Node Bs, 5G NBs, APs, or some other term). As described above, a TRP may be used interchangeably with "cell."

The TRPs 208 may be a DU. The TRPs may be connected to one ANC (ANC 202) or more than one ANC (not illustrated). For example, for RAN sharing, radio as a service (RaaS), and service specific AND deployments, the TRP may be connected to more than one ANC. A TRP may include one or more antenna ports. The TRPs may be configured to individually (e.g., dynamic selection) or jointly (e.g., joint transmission) serve traffic to a UE.

The local architecture 200 may be used to illustrate fronthaul definition. The architecture may be defined that support fronthauling solutions across different deployment types. For example, the architecture may be based on transmit network capabilities (e.g., bandwidth, latency, and/or jitter).

The architecture may share features and/or components with LTE. According to aspects, the next generation AN (NG-AN) 210 may support dual connectivity with NR. The NG-AN may share a common fronthaul for LTE and NR.

The architecture may enable cooperation between and among TRPs 208. For example, cooperation may be preset within a TRP and/or across TRPs via the ANC 202. According to aspects, no inter-TRP interface may be needed/present.

According to aspects, a dynamic configuration of split logical functions may be present within the architecture 200. As will be described in more detail with reference to FIG. 5, the Radio Resource Control (RRC) layer, Packet Data Convergence Protocol (PDCP) layer, Radio Link Control (RLC) layer, Medium Access Control (MAC) layer, and a Physical (PHY) layers may be adaptably placed at the DU or CU (e.g., TRP or ANC, respectively). According to certain aspects, a BS may include a central unit (CU) (e.g., ANC 202) and/or one or more distributed units (e.g., one or more TRPs 208).

Figure 3:
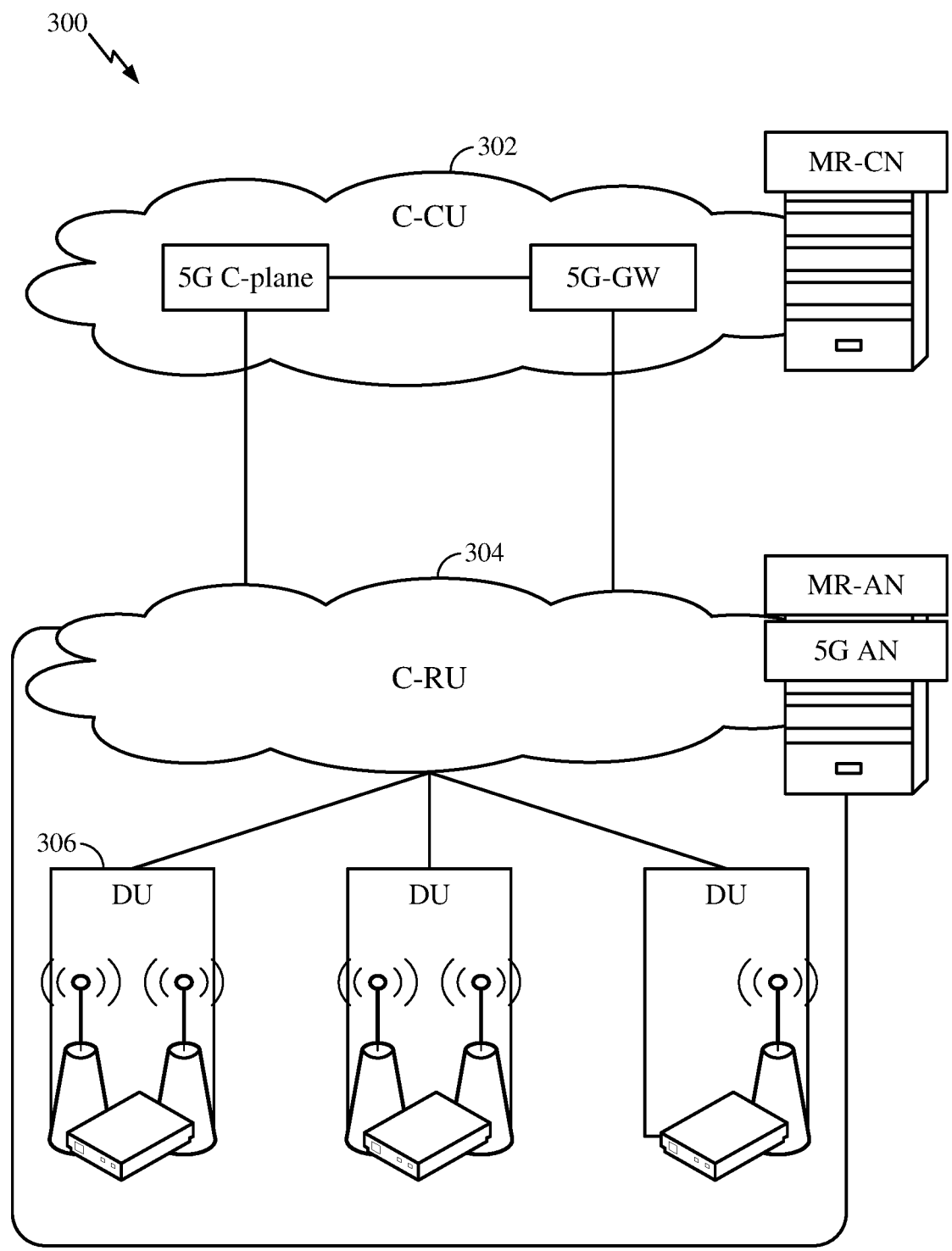
FIG. 3 is a diagram illustrating an example physical architecture of a distributed RAN, in accordance with certain aspects of the present disclosure.

FIG. 3 illustrates an example physical architecture of a distributed RAN 300, according to aspects of the present disclosure. A centralized core network unit (C-CU) 302 may host core network functions. The C-CU may be centrally deployed. C-CU functionality may be offloaded (e.g., to advanced wireless services (AWS)), in an effort to handle peak capacity.

A centralized RAN unit (C-RU) 304 may host one or more ANC functions. Optionally, the C-RU may host core network functions locally. The C-RU may have distributed deployment. The C-RU may be closer to the network edge.

A DU 306 may host one or more TRPs (edge node (EN), an edge unit (EU), a radio head (RH), a smart radio head (SRH), or the like). The DU may be located at edges of the network with radio frequency (RF) functionality.

Figure 4:
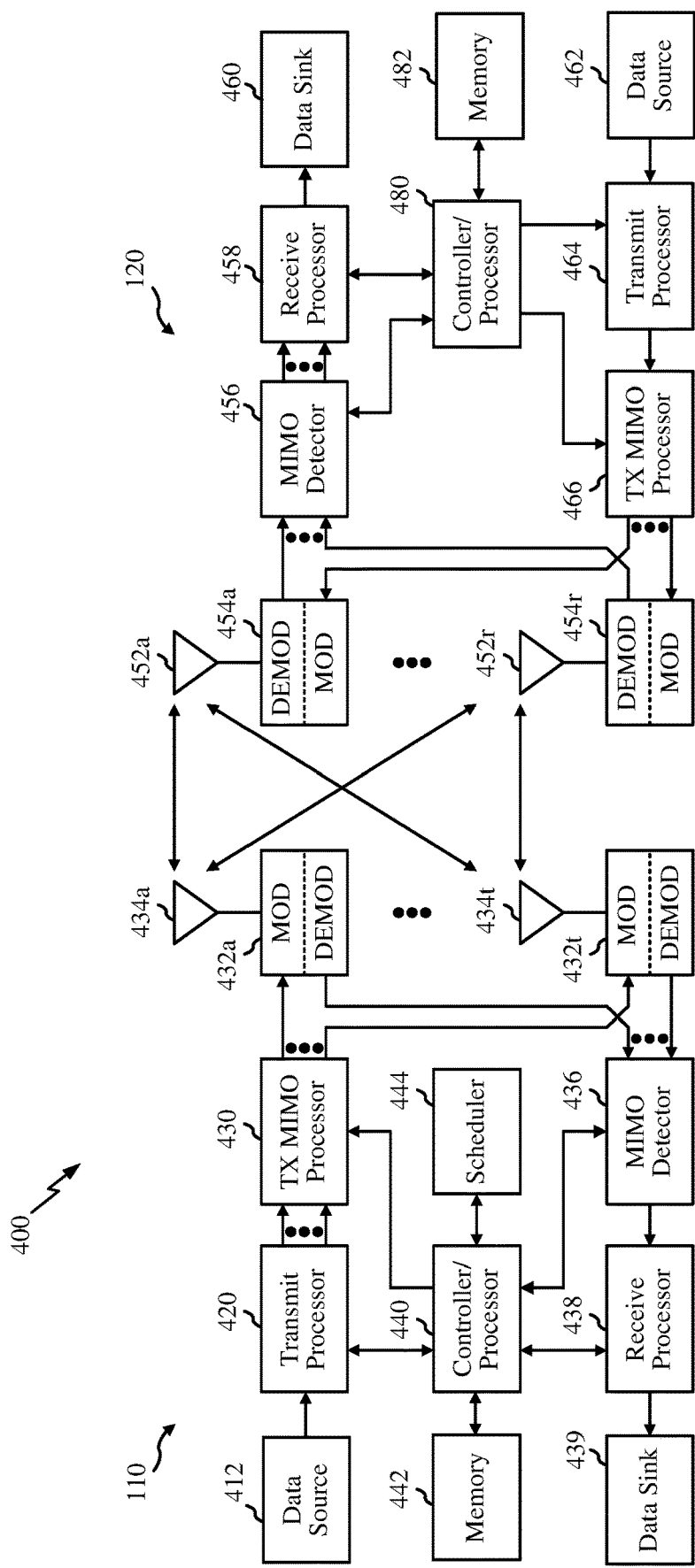
FIG. 4 is a block diagram conceptually illustrating a design of an example BS and user equipment (UE), in accordance with certain aspects of the present disclosure.

FIG. 4 illustrates example components of the BS 110 and UE 120 illustrated in FIG. 1, which may be used to implement aspects of the present disclosure. As described above, the BS may include a TRP. One or more components of the BS 110 and UE 120 may be used to practice aspects of the present disclosure. For example, antennas 452, Tx/Rx 222, processors 466, 458, 464, and/or controller/processor 480 of the UE 120 and/or antennas 434, processors 460, 420, 438, and/or controller/processor 440 of the BS 110 may be used to perform the operations described herein and illustrated with reference to FIGS. 8-10.

FIG. 4 shows a block diagram of a design of a BS 110 and a UE 120, which may be one of the BSs and one of the UEs in FIG. 1. For a restricted association scenario, the base station 110 may be the macro BS 110c in FIG. 1, and the UE 120 may be the UE 120y. The base station 110 may also be a base station of some other type. The base station 110 may be equipped with antennas 434a through 434t, and the UE 120 may be equipped with antennas 452a through 452r.

At the base station 110, a transmit processor 420 may receive data from a data source 412 and control information from a controller/processor 440. The control information may be for the Physical Broadcast Channel (PBCH), Physical Control Format Indicator Channel (PCFICH), Physical Hybrid ARQ Indicator Channel (PHICH), Physical Downlink Control Channel (PDCCH), etc. The data may be for the Physical Downlink Shared Channel (PDSCH), etc. The processor 420 may process (e.g., encode and symbol map) the data and control information to obtain data symbols and control symbols, respectively. The processor 420 may also generate reference symbols, e.g., for the PSS, SSS, and cell-specific reference signal. A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432a through 432t. Each modulator 432 may process a respective output symbol stream (e.g., for OFDM, etc.) to obtain an output sample stream. Each modulator 432 may further process (e.g., convert to analog, amplify, filter, and upconvert) the output sample stream to obtain a downlink signal. Downlink signals from modulators 432a through 432t may be transmitted via the antennas 434a through 434t, respectively.

At the UE 120, the antennas 452a through 452r may receive the downlink signals from the base station 110 and may provide received signals to the demodulators (DE-MODs) 454a through 454r, respectively. Each demodulator 454 may condition (e.g., filter, amplify, downconvert, and digitize) a respective received signal to obtain input samples. Each demodulator 454 may further process the input samples (e.g., for OFDM, etc.) to obtain received symbols. A MIMO detector 456 may obtain received symbols from all the demodulators 454a through 454r, perform MIMO detection on the received symbols if applicable, and provide detected symbols. A receive processor 458 may process (e.g., demodulate, deinterleave, and decode) the detected symbols, provide decoded data for the UE 120 to a data sink 460, and provide decoded control information to a controller/processor 480. According to one or more cases, CoMP aspects can include providing the antennas, as well as some Tx/Rx functionalities, such that they reside in distributed units. For example, some Tx/Rx processing can be done in the central unit, while other processing can be done at the distributed units. For example, in accordance with one or more aspects as shown in the diagram, the BS mod/demod 432 may be in the distributed units.

On the uplink, at the UE 120, a transmit processor 464 may receive and process data (e.g., for the Physical Uplink Shared Channel (PUSCH)) from a data source 462 and control information (e.g., for the Physical Uplink Control Channel (PUCCH) from the controller/processor 480. The transmit processor 464 may also generate reference symbols for a reference signal. The symbols from the transmit processor 464 may be precoded by a TX MIMO processor 466 if applicable, further processed by the modulators 454a through 454r (e.g., for SC-FDM, etc.), and transmitted to the base station 110. At the BS 110, the uplink signals from the UE 120 may be received by the antennas 434, processed by the demodulators 432, detected by a MIMO detector 436 if applicable, and further processed by a receive processor 438 to obtain decoded data and control information sent by the UE 120. The receive processor 438 may provide the decoded data to a data sink 439 and the decoded control information to the controller/processor 440.

The controllers/processors 440 and 480 may direct the operation at the base station 110 and the UE 120, respectively. The processor 440 and/or other processors and modules at the base station 110 may perform or direct, e.g., the processes for the techniques described herein. The processor 480 and/or other processors and modules at the UE 120 may also perform or direct, e.g., execution of the functional blocks illustrated in FIG. 9, and/or other processes for the techniques described herein. The memories 442 and 482 may store data and program codes for the BS 110 and the UE 120, respectively. A scheduler 444 may schedule UEs for data transmission on the downlink and/or uplink.

Figure 5:
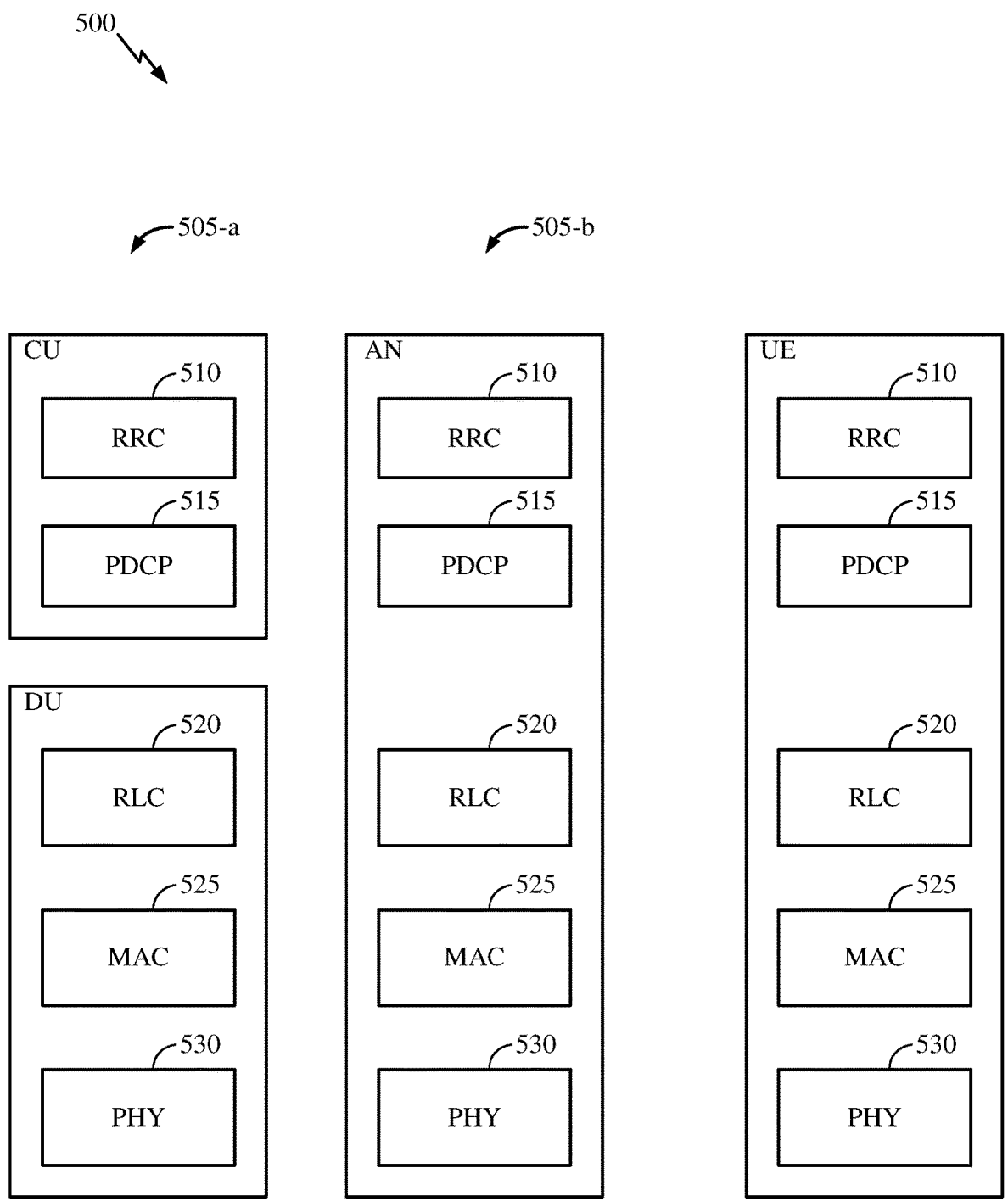
FIG. 5 is a diagram showing examples for implementing a communication protocol stack, in accordance with certain aspects of the present disclosure.

FIG. 5 illustrates a diagram 500 showing examples for implementing a communications protocol stack, according to aspects of the present disclosure. The illustrated communications protocol stacks may be implemented by devices operating in a in a 5G system (e.g., a system that supports uplink-based mobility). Diagram 500 illustrates a communications protocol stack including a Radio Resource Control (RRC) layer 510, a Packet Data Convergence Protocol (PDCP) layer 515, a Radio Link Control (RLC) layer 520, a Medium Access Control (MAC) layer 525, and a Physical (PHY) layer 530. In various examples the layers of a protocol stack may be implemented as separate modules of software, portions of a processor or ASIC, portions of non-collocated devices connected by a communications link, or various combinations thereof. Collocated and non-collocated implementations may be used, for example, in a protocol stack for a network access device (e.g., ANs, CUs, and/or DUs) or a UE.

A first option 505-a shows a split implementation of a protocol stack, in which implementation of the protocol stack is split between a centralized network access device (e.g., an ANC 202 in FIG. 2) and distributed network access device (e.g., DU 208 in FIG. 2). In the first option 505-a, an RRC layer 510 and a PDCP layer 515 may be implemented by the central unit, and an RLC layer 520, a MAC layer 525, and a PHY layer 530 may be implemented by the DU. In various examples the CU and the DU may be collocated or non-collocated. The first option 505-a may be useful in a macro cell, micro cell, or pico cell deployment.

A second option 505-b shows a unified implementation of a protocol stack, in which the protocol stack is implemented in a single network access device (e.g., access node (AN), new radio base station (NR BS), a new radio Node-B (NR NB), a network node (NN), or the like). In the second option, the RRC layer 510, the PDCP layer 515, the RLC layer 520, the MAC layer 525, and the PHY layer 530 may each be implemented by the AN. The second option 505-b may be useful in a femto cell deployment.

Regardless of whether a network access device implements part or all of a protocol stack, a UE may implement an entire protocol stack (e.g., the RRC layer 510, the PDCP layer 515, the RLC layer 520, the MAC layer 525, and the PHY layer 530).

Figure 6:
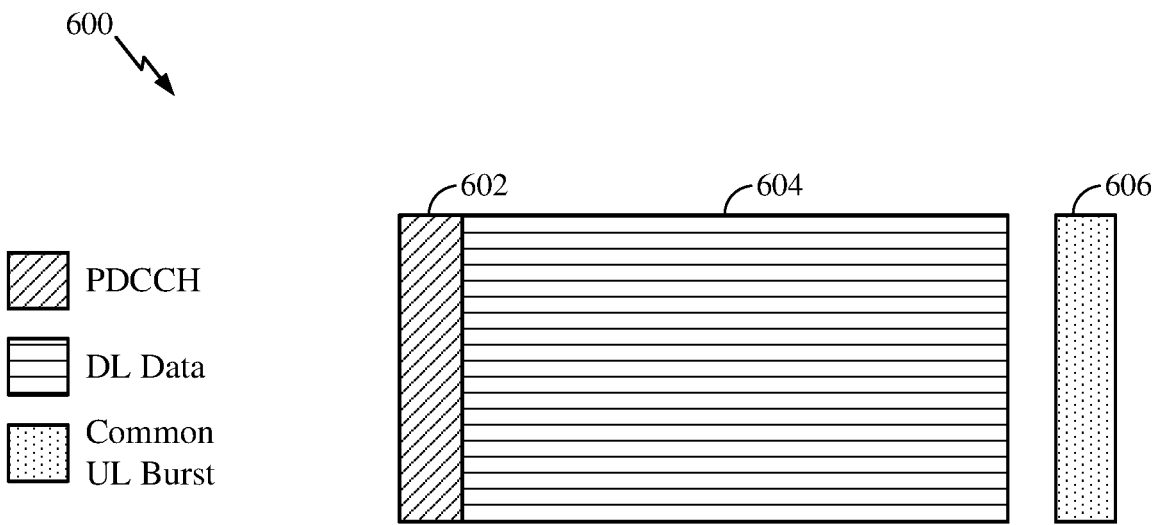
FIG. 6 illustrates an example of a downlink-centric (DL-centric) subframe, in accordance with certain aspects of the present disclosure.

FIG. 6 is a diagram 600 showing an example of a DL-centric subframe. The DL-centric subframe may include a control portion 602. The control portion 602 may exist in the initial or beginning portion of the DL-centric subframe. The control portion 602 may include various scheduling information and/or control information corresponding to various portions of the DL-centric subframe. In some configurations, the control portion 602 may be a physical DL control channel (PDCCH), as indicated in FIG. 6. The DL-centric subframe may also include a DL data portion 604. The DL data portion 604 may sometimes be referred to as the payload of the DL-centric subframe. The DL data portion 604 may include the communication resources utilized to communicate DL data from the scheduling entity (e.g., UE or BS) to the subordinate entity (e.g., UE). In some configurations, the DL data portion 604 may be a physical DL shared channel (PDSCH).

The DL-centric subframe may also include a common UL portion 606. The common UL portion 606 may sometimes be referred to as an UL burst, a common UL burst, and/or various other suitable terms. The common UL portion 606 may include feedback information corresponding to various other portions of the DL-centric subframe. For example, the common UL portion 606 may include feedback information corresponding to the control portion 602. Non-limiting examples of feedback information may include an ACK signal, a NACK signal, a HARQ indicator, and/or various other suitable types of information. The common UL portion 606 may include additional or alternative information, such as information pertaining to random access channel (RACH) procedures, scheduling requests (SRs), and various other suitable types of information. As illustrated in FIG. 6, the end of the DL data portion 604 may be separated in time from the beginning of the common UL portion 606. This time separation may sometimes be referred to as a gap, a guard period, a guard interval, and/or various other suitable terms. This separation provides time for the switch-over from DL communication (e.g., reception operation by the subordinate entity (e.g., UE)) to UL communication (e.g., transmission by the subordinate entity (e.g., UE)). One of ordinary skill in the art will understand that the foregoing is merely one example of a DL-centric subframe and alternative structures having similar features may exist without necessarily deviating from the aspects described herein.

Figure 7:
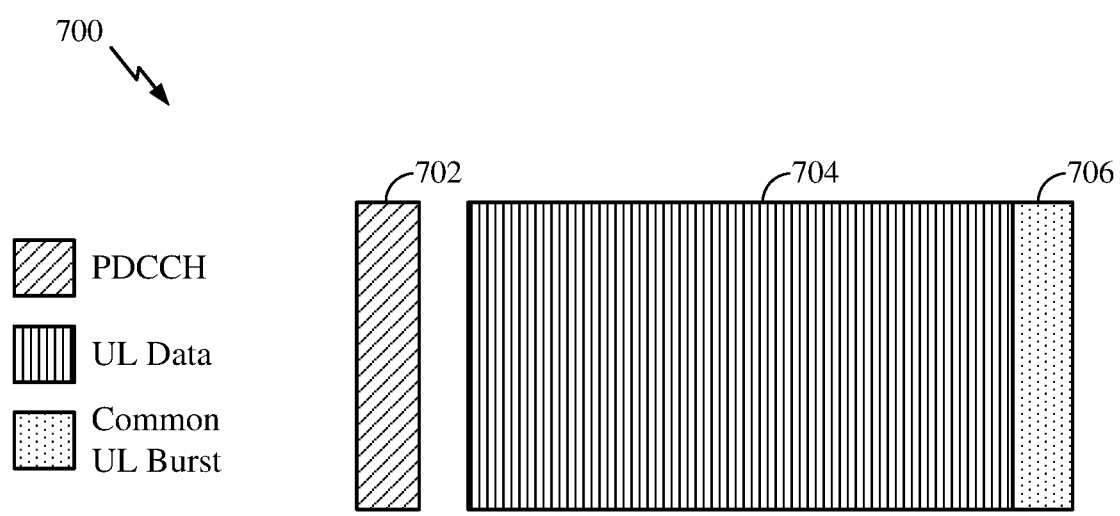
FIG. 7 illustrates an example of an uplink-centric (UL-centric) subframe, in accordance with certain aspects of the present disclosure.

FIG. 7 is a diagram 700 showing an example of an UL-centric subframe. The UL-centric subframe may include a control portion 702. The control portion 702 may exist in the initial or beginning portion of the UL-centric subframe. The control portion 702 in FIG. 7 may be similar to the control portion described above with reference to FIG. 6. The UL-centric subframe may also include an UL data portion 704. The UL data portion 704 may sometimes be referred to as the payload of the UL-centric subframe. The UL data portion may refer to the communication resources utilized to communicate UL data from the subordinate entity (e.g., UE) to the scheduling entity (e.g., UE or BS). In some configurations, the control portion 702 may be a physical DL control channel (PDCCH).

As illustrated in FIG. 7, the end of the control portion 702 may be separated in time from the beginning of the UL data portion 704. This time separation may sometimes be referred to as a gap, guard period, guard interval, and/or various other suitable terms. This separation provides time for the switch-over from DL communication (e.g., reception operation by the scheduling entity) to UL communication (e.g., transmission by the scheduling entity). The UL-centric subframe may also include a common UL portion 706. The common UL portion 706 in FIG. 7 may be similar to the common UL portion 706 described above with reference to FIG. 7. The common UL portion 706 may additionally or alternatively include information pertaining to channel quality indicator (CQI), sounding reference signals (SRSs), and various other suitable types of information. One of ordinary skill in the art will understand that the foregoing is merely one example of an UL-centric subframe and alternative structures having similar features may exist without necessarily deviating from the aspects described herein.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

A UE may operate in various radio resource configurations, including a configuration associated with transmitting pilots using a dedicated set of resources (e.g., a radio resource control (RRC) dedicated state, etc.) or a configuration associated with transmitting pilots using a common set of resources (e.g., an RRC common state, etc.). When operating in the RRC dedicated state, the UE may select a dedicated set of resources for transmitting a pilot signal to a network. When operating in the RRC common state, the UE may select a common set of resources for transmitting a pilot signal to the network. In either case, a pilot signal transmitted by the UE may be received by one or more network access devices, such as an AN, or a DU, or portions thereof. Each receiving network access device may be configured to receive and measure pilot signals transmitted on the common set of resources, and also receive and measure pilot signals transmitted on dedicated sets of resources allocated to the UEs for which the network access device is a member of a monitoring set of network access devices for the UE. One or more of the receiving network access devices, or a CU to which receiving network access device(s) transmit the measurements of the pilot signals, may use the measurements to identify serving cells for the UEs, or to initiate a change of serving cell for one or more of the UEs.

Example Actual Transmission Power Backoff Report

Power headroom (PH) generally indicates how much transmission power is left for a UE to use in addition to the power being used for a current transmission (e.g., PUSCH transmission). Power headroom may be described as the maximum UE transmission power minus current PUSCH power. A positive value of the power headroom indicates that the UE has more power to spare for UL transmissions. A negative value of the power headroom indicates that the UE is required to transmit at a power higher than what the UE is allowed to transmit.

Power Headroom Report (PHR) is a type of MAC CE (MAC Control Element) that reports the headroom between the current UE Tx power (estimated power) and the nominal power. The network (e.g., base station) uses this report value to estimate how much uplink bandwidth a UE can use for a specific subframe.

In certain aspects, a reported PHR may not reflect the actual PH at the time of UL transmission. The discrepancy between the reported PHR and the actual PH may be due to the delay between the reported PHR and actual transmission. The delay may be caused by the restraint on PHR transmission including PHR can be transmitted only when UE has UL resources allocated and that resource can accommodate a MAC CE. In addition, delay may be caused by a PHR-Prohibit timer. In conjunction to the delay, the discrepancy may arise because UE Tx power may be impacted by time-varying maximum permissible exposure (MPE) condition and time-varying nature of the serving beam. In such cases, UE may be required to further backoff its Tx transmission power to satisfy the MPE restraints and/or adjust to the variation of the serving beam.

For example, time-varying MPE condition may require the UE to reduce or backoff its transmission power. In NR or 5G network, especially when transmitting in the mmWave frequency band, a transmitter may use a higher antenna gain as compared to transmitting in the sub-6 gigahertz (GHz) frequency band. As a result, the effective isotropic radiated power (EIRP), which represents the radiated power in a particular direction (e.g., the direction of the beam), may be higher compared to sub-6 GHz communications. To improve safety, some governing bodies, such as Federal Communications Commission (FCC) and International Commission on Non-Ionizing Radiation Protection (ICNIRP), have placed constraints on the peak EIRP that can be directed toward the human body, sometimes referred to as maximum permissible exposure (MPE).

A transmitter may be subject to a transmission limitation due to an MPE condition (e.g., a limit on an antenna gain, a limit on a transmit power, and/or the like). In some aspects, an MPE condition may be time-varying and be due to a hand or other body part blocking scenario, where a hand or other body part of a user blocks or obstructs communications to and/or from an antenna subarray, or is otherwise positioned near the antenna subarray. Additionally, or alternatively, variation of MPE condition may be due to use of different UE subarrays and different directions of the given subarray. Variation of MPE condition may also be due to different transmission activity of the UE. After determining that there is an MPE condition, the UE may determine the maximum allowable UL transmission power that the UE can transmit while meeting the MPE constraint. For example, the UE can backoff or reduce the UL transmission power so that the MPE constraint is met.

For example, time-varying nature of a serving beam may require the UE to reduce or backoff its transmission power. Serving beam of the UE may change due to UE movement or rotation. Serving beam of the UE may also change due to BS movement or rotation. In such cases, UE may backoff or reduce the UL transmission power to adjust to the variation of the serving beam.

In certain aspects, a reference PHR, which is different from an actual PHR, is reported for cases when UE does not have the assignment information available at the time of calculating PH. For example, in case of carrier aggregation (CA), there may be multiple carriers/cells configured for the UE, but at the time of calculating PH (e.g., based on a PHR trigger) there may be data scheduled only for a subset of carriers in a particular TTI (e.g., slot). In this case the UE reports reference PHR for the TTI for those carriers which do not have any uplink data scheduled in that TTI. In an aspect, unlike actual PH, reference PH is not based on DCI decoded by a UE.

In certain cases, (e.g., in NR) the UE may not have enough time to calculate actual PH for certain carriers/cells based on DCI received on respective carriers. In an aspect, the PHR data including PHRs for multiple carriers is encoded and transmitted over a single carrier. Generally, the PHR for all carriers is included in a MAC header of that carrier. Multiple carriers may be scheduled for UL data transmission in a particular slot, but the UE may not have enough time to calculate PH for that slot with respect to a subset of carriers based on actual DCI information. In an aspect, the PHR data is encoded with data scheduled in the slot, and thus, the PHR needs to be processed well in advance of the transmission, for example, along with the UL data (e.g., PUSCH) to be transmitted in the slot. The UE may not receive DCI for every carrier that has data scheduled in the slot in time for calculating the PHR for transmission in the slot. Thus, the UE transmits a reference PHR in the slot for those carriers for which the UE does not receive DCI in time for processing with other PHRs of other carriers and/or other UL data scheduled in the slot.

Thus, there may be two scenarios in which a UE transmits a PHR that is not consistent with the actual PH. A first scenario is when a UE additionally reduces its transmission power due to time-variation of MPE and/or serving beam. A second scenario is when a UE transmits a reference PHR which is different from an actual PHR.

Figure 8:
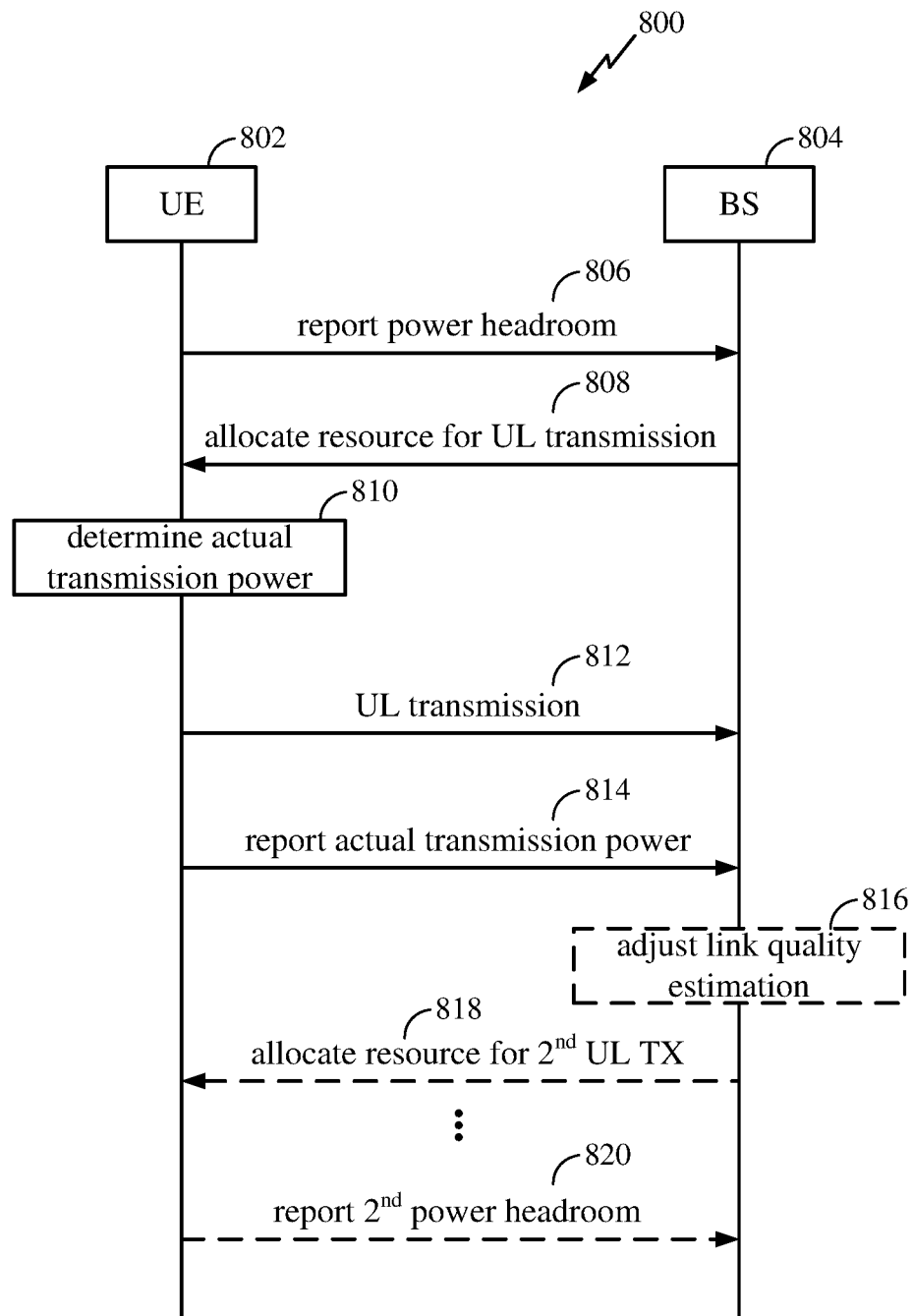
FIG. 8 illustrates an example operation 800 for reporting and processing actual transmission power report by a UE and a BS, in accordance with certain aspects of the present disclosure.

FIG. 8 illustrates an example operation 800 for reporting and processing actual transmission power report by a UE and a BS, in accordance with certain aspects of the present disclosure. According to the operation 800 in FIG. 8, in step 806, a UE 802 may send an indication of power headroom (PH) to a base station (BS) 804. The indication of power headroom may be in the form of a power headroom report (PHR). The BS, as in step 808, may allocate resources for UE's UL transmission that may be based on the indication of PH received in step 806.

In an aspect, at block 810, the UE may determine the actual transmission power the UE will use in the UL transmission. Determination of the actual transmission power may be based on evaluation of the MPE condition variation and/or variation of the serving beam. For example, variation of MPE condition and/or variation of the serving beam after sending the indication of PH until scheduling of the UL transmission may be considered in the determining of the actual transmission power. In an aspect, the UL transmission may be transmission of data or control. For example, the UL transmission may be UL transmission on physical uplink shared channel (PUSCH), physical uplink control channel (PUCCH), or sounding reference signal (SRS).

In an aspect, at block 812, the UE may send the UL transmission, to the BS, based on the determined actual transmission power of block 810.

In an aspect, in step 814, the UE may send, to the BS, an indication of the determined actual transmission power of the UL transmission. The indication of the actual transmission power may be an additional power backoff from the indication of PH sent in step 806. In an aspect, the indication of actual transmission power may be transmitted if the additional power backoff exceeds a certain threshold, at every UL transmission, periodically, or combination thereof. Alternatively, the indication of the actual transmission power may be the transmission power scheduled for the UL transmission. In an aspect, the indication of actual transmission power may be transmitted if the actual transmission power exceeds or is below a certain threshold, at every UL transmission, periodically, or combination thereof. For example, the indication of actual transmission power may be transmitted prior to sending a second indication of PH, e.g., second PHR.

In an aspect, the indication of the actual transmission power may be transmitted along with the UL transmission. For example, the indication of the actual transmission power may be piggybacked on the UL transmission, e.g., along the UL data transmission in PUSCH, along with PUCCH. In particular, the indication of the actual transmission power may be transmitted in the same PUSCH as the UL transmission. In another aspect, the indication of the actual transmission power may be transmitted as a separate control signal. For example, the indication of the actual transmission power may be sent in PUCCH as a new uplink control information (UCI).

In an aspect, in block 816, the BS may adjust its link quality estimation based on the received indication of actual transmission power. For example, the BS upon not receiving one or more allocated UL transmission may not perceive the cause as a sudden degradation of the channel (e.g., increase in path loss) based on the received indication of actual transmission power.

In an aspect, in step 818, the BS may allocate resources for a second UL transmission based on the indication of PH and the adjusted estimate of the link quality. In an aspect, in step 820, the UE may report a 2nd PH to the BS.

Figure 9:
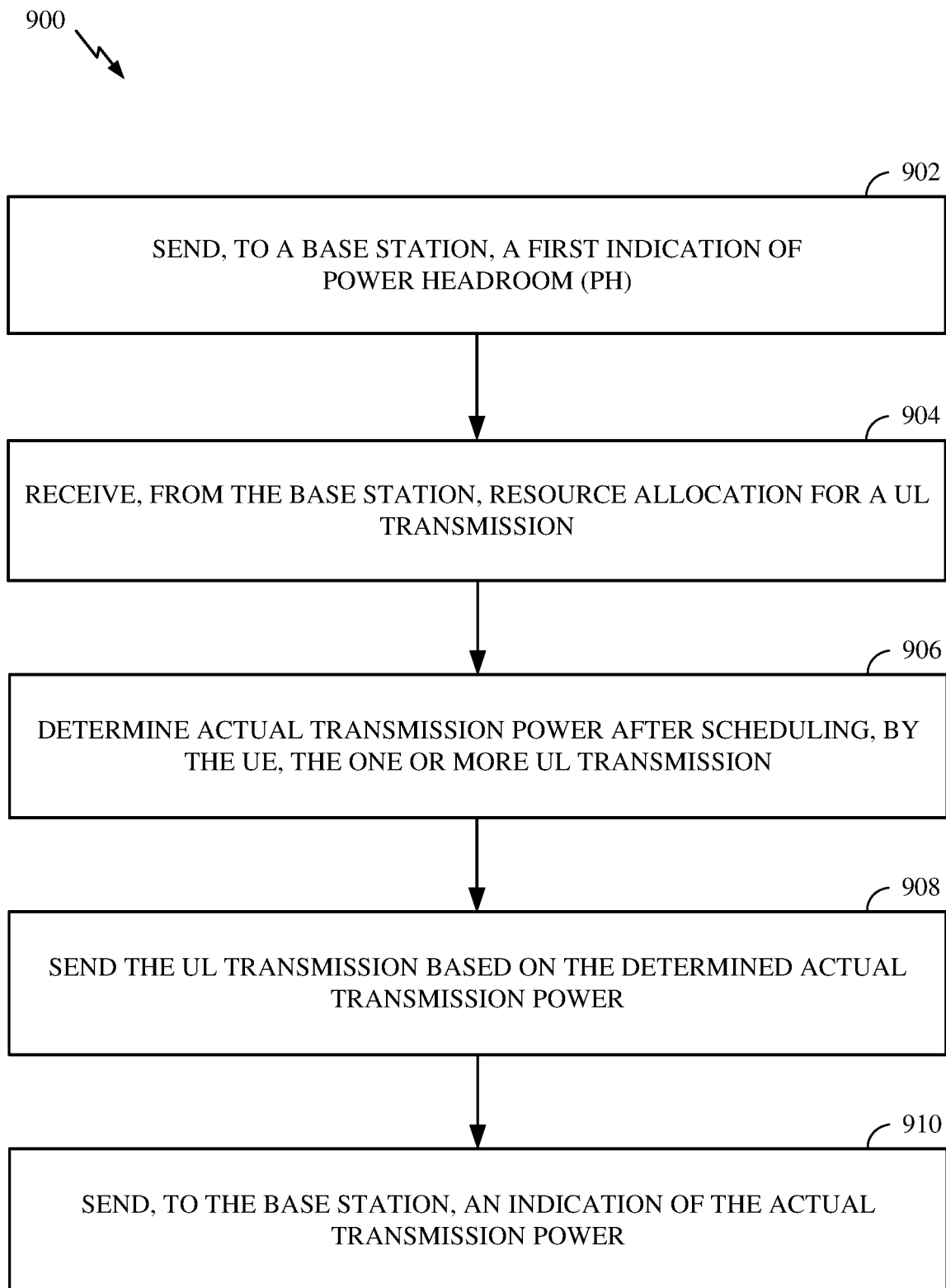
FIG. 9 illustrates example operations 900 for reporting actual transmission power by a UE, in accordance with certain aspects of the present disclosure.

FIG. 9 illustrates example operations 900 for reporting actual transmission power by a UE, in accordance with certain aspects of the present disclosure. According to the operation 900 in FIG. 9, in block 902, the UE may send a first indication of PH to a BS. In an aspect, in block 904, the UE may receive one or more resource allocation for a UL transmission from the BS. The resource allocation received may be based on the first indication of PH sent by the UE. In an aspect, in block 906, the UE may determine the actual transmission power to be used in the UL transmission. The determination may be based on the varying MPE condition, varying serving beam, UL transmission type, or combination thereof. In an aspect, in block 908, the UE, may send the UL transmission to the BS. The UL transmission would be based on the determined actual transmission power. In an aspect, in block 910, the UE may send an indication of the actual transmission power to the BS. The indication of the actual transmission power may be an additional backoff power compared to that of the indication of PH that was sent. The indication of the actual transmission power may be sent along with the UL transmission or sent as a separate control signal.

Various operations 900 of FIG. 9 may be performed by the UE 120 in FIG. 4. In particular, blocks 902, 904, and 908 may be performed by a antennas 452, Tx/Rx 222, processors 466, 458, 464, and/or controller/processor 480. Block 906 may be performed by processors 466, 458, 464, and/or controller/processor 480.

Figure 10:
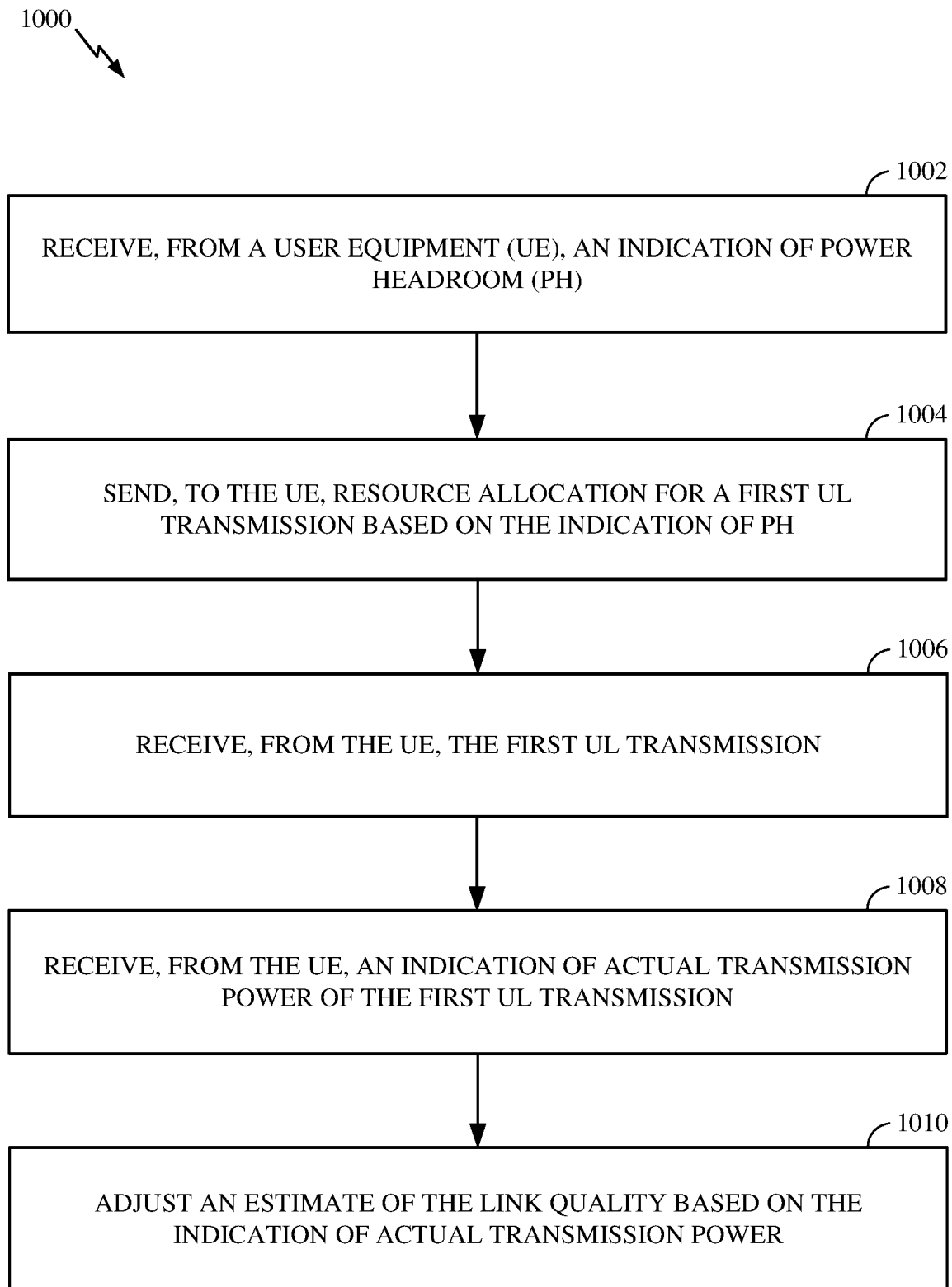
FIG. 10 illustrates example operations 1000 for receiving and processing actual transmission power report by a BS, in accordance with certain aspects of the present disclosure.

FIG. 10 illustrates example operations 1000 for receiving and processing actual transmission power report by a BS, in accordance with certain aspects of the present disclosure. According to the operation 1000 in FIG. 10, in block 1002, a BS may receive an indication of PH from a UE. In an aspect, in block 1004, the BS may send, to the UE, one or more resource allocation for a first UL transmission based on the indication of PH. In an aspect, in block 1006, the BS may receive, from the UE, the first UL transmission. In an aspect, in block 1008, the BS may receive an indication of actual transmission power of the first UL transmission from the UE. In an aspect, in block 1010, the BS may adjust an estimate of the link quality based on the indication of the actual transmission power. The BS may further send one or more resource allocation for a second UL transmission based at least on the indication of PH and the adjusted estimate of the link quality.

Various operations 1000 of FIG. 10 may be performed by the BS 110 in FIG. 4. In particular, blocks 1002, 1004, 1006, and 1008 may be performed by antennas 434, processors 460, 420, 438, and/or controller/processor 440. Block 1010 may be performed by processors 460, 420, 438, and/or controller/processor 440.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

Moreover, the term "or" is intended to mean an inclusive "or" rather than an exclusive "or." That is, unless specified otherwise, or clear from the context, the phrase, for example, "X employs A or B" is intended to mean any of the natural inclusive permutations. That is, for example the phrase "X employs A or B" is satisfied by any of the following instances: X employs A; X employs B; or X employs both A and B. As used herein, reference to an element in the singular is not intended to mean "one and only one" unless specifically so stated, but rather "one or more." For example, the articles "a" and "an" as used in this application and the appended claims should generally be construed to mean "one or more" unless specified otherwise or clear from the context to be directed to a singular form. Unless specifically stated otherwise, the term "some" refers to one or more. A phrase referring to "at least one of" a list of items refers to any combination of those items, including single members. As an example, "at least one of: a, b, or c" is intended to cover: a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c). As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

For example, means for transmitting and/or means for receiving may comprise one or more of a transmit processor 420, a TX MIMO processor 430, a receive processor 438, or antenna(s) 434 of the base station 110 and/or the transmit processor 464, a TX MIMO processor 466, a receive processor 458, or antenna(s) 452 of the user equipment 120. Additionally, means for obtaining, means for designating, means for aggregating, means for collecting, means for selecting, means for switching, and means for detecting may comprise one or more processors, such as the controller/processor 480, transmit processor 464, receive processor 458, and/or MIMO processor 466 of the user equipment 120.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, phase change memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for wireless communication by a user equipment (UE), comprising:
sending, to a base station, a first indication of power headroom (PH);
receiving, from the base station, resource allocation for an uplink (UL) transmission;
determining actual transmission power to be used in the UL transmission, wherein the determining actual transmission power is at least based on an interval from sending the first indication of PH until the UL transmission is scheduled;
sending, to the base station, the UL transmission based on the determined actual transmission power; and
sending, to the base station, an indication of the actual transmission power.

2. The method of claim 1, wherein the indication of the actual transmission power is an additional power backoff from the first indication of PH.

3. The method of claim 2, further comprising:
comparing the additional power backoff with a threshold; and
basing the sending of the indication of the actual transmission power on at least on the comparison.

4. The method of claim 1, wherein the UL transmission is data transmission in physical uplink shared channel (PUSCH).

5. The method of claim 4, wherein the sending the indication of the actual transmission power piggybacked is piggybacked on the data transmission in PUSCH.

6. The method of claim 1, wherein the indication of the actual transmission power is sent in a control channel.

7. The method of claim 1, further comprising:
basing the determining of the actual transmission power on maximum permissible exposure (MPE) condition, serving beam, the UL transmission, or combination thereof.

8. The method of claim 1, wherein the indication of the actual transmission power is sent prior to a second PH indication.

9. A wireless communication device, comprising:
at least one radio frequency RF resource;
a processor; and
a memory storing instructions that, when instructed by the processor, causes the wireless communication device to:
send, to a base station, a first indication of power headroom (PH);
receive, from the base station, resource allocation for an uplink (UL) transmission;
determine actual transmission power to be used in the UL transmission, wherein the determining actual transmission power is at least based on an interval from sending the first indication of PH until the UL transmission is scheduled;
send, to the base station, the UL transmission based on the determined actual transmission power; and
send, to the base station, an indication of the actual transmission power.

10. The wireless communication device of claim 9, wherein the indication of the actual transmission power is an additional power backoff from the first indication of PH.

11. The wireless communication device of claim 10, wherein the memory storing instructions that, when instructed by the processor, causes the wireless communication device to further:
compare the additional power backoff with a threshold; and
base the sending of the indication of the actual transmission power at least on the comparison.

12. The wireless communication device of claim 9, wherein the UL transmission is data transmission in physical uplink shared channel (PUSCH).

13. The wireless communication device of claim 12, wherein the sending the indication of the actual transmission power is piggybacked on the data transmission in PUSCH.

14. The wireless communication device of claim 9, wherein the indication of the actual transmission power is sent in a control channel.

15. The wireless communication device of claim 9, further comprising:
base the determining of the actual transmission power on maximum permissible exposure (MPE) condition, serving beam, scheduled UL transmission, or combination thereof.

16. The wireless communication device of claim 9, wherein the indication of the actual transmission power is sent prior to a second PH indication.

17. A wireless communication device, comprising:
means for sending, to a base station, a first indication of power headroom (PH);
means for receiving, from the base station, resource allocation for an uplink (UL) transmission;
means for determining actual transmission power to be used in the UL transmission wherein the determining actual transmission power is at least based on an interval from sending the first indication of PH until the UL transmission is scheduled;
means for sending, to the base station, the UL transmission based on the determined actual transmission power; and
means for sending, to the base station, an indication of the actual transmission power.

18. The wireless communication device of claim 17, wherein the indication of the actual transmission power is an additional power backoff from the first indication of PH.

19. The wireless communication device of claim 18, further comprising:
means for comparing the additional power backoff with a threshold; and
basing the sending of the indication of the actual transmission power at least on the comparison.

20. The wireless communication device of claim 17, wherein the UL transmission is data transmission in physical uplink shared channel (PUSCH).

21. The wireless communication device of claim 20, wherein sending the indication of the actual transmission power piggybacked on the data transmission in PUSCH.

22. The wireless communication device of claim 17, wherein the indication of the actual transmission power is sent in a control channel.

23. The wireless communication device of claim 17, further comprising:
basing the determining of the actual transmission power on maximum permissible exposure (MPE) condition, serving beam, scheduled UL transmission, or combination thereof.

24. The wireless communication device of claim 17, wherein the indication of the actual transmission power is sent prior to a second PH indication.

25. A method for wireless communication by a base station, comprising:
receiving, from a user equipment (UE), an indication of power headroom (PH);
sending, to the UE, resource allocation for a first uplink (UL) transmission based at least on the indication of PH;
receiving, from the UE, the first UL transmission;
receiving, from the UE, an indication of actual transmission power of the first UL transmission, wherein the indication of actual transmission power is at least based on an interval from the UE sending the first indication of PH until the UE schedules the first UL transmission; and
adjusting an estimate of the link quality based on the indication of actual transmission power.

26. The method of claim 25, further comprising:
sending, to the UE, resource allocation for a second UL transmission based on the indication of PH and the adjusted estimate of the link quality.

27. A wireless communication device, comprising:
at least one radio frequency RF resource;
a processor; and
a memory storing instructions that, when instructed by the processor, causes the wireless communication device to:
receive, from a user equipment (UE), an indication of power headroom (PH);
send, to the UE, resource allocation for a first uplink (UL) transmission based at least on the indication of PH;
receive, from the UE, the first UL transmission;
receive, from the UE, an indication of actual transmission power of the first UL transmission, wherein the indication of actual transmission power is at least based on an interval from the UE sending the first indication of PH until the UE schedules the first UL transmission; and
adjust an estimate of the link quality based on the indication of actual transmission power.

28. The wireless communication device of claim 27, wherein the memory storing instructions that, when instructed by the processor, causes the wireless communication device to further:
  send, to the UE, resource allocation for a second UL transmission based on the indication of PH and the adjusted estimate of the link quality.

29. A wireless communication device, comprising:
  means for receiving, from a user equipment (UE), an indication of power headroom (PH);
  means for sending, to the UE, resource allocation for a first uplink (UL) transmission based at least on the indication of PH;
  means for receiving, from the UE, the first UL transmission;
  means for receiving, from the UE, an indication of actual transmission power of the first UL transmission, wherein the indication of actual transmission power is at least based on an interval from the UE sending the first indication of PH until the UE schedules the first UL transmission; and
  means for adjusting an estimate of the link quality based on the indication of actual transmission power.

30. The wireless communication device of claim 29, further comprising:
  means for sending, to the UE, resource allocation for a second UL transmission based on the indication of PH and the adjusted estimate of the link quality.

* * * * *